Patented June 6, 1944

2,350,516

UNITED STATES PATENT OFFICE 2,350,516

PHOTOENGRAVING

Walter S. Marx, Jr., Santa Barbara, Calif., assignor to Printing Arts Research Laboratories, Inc., Santa Barbara, Calif., a corporation of Delaware No Drawing. Application July 29, 1942, Serial No. 452,787

6 Claims. (Cl. 95—5)

This invention relates to photoengraving and particularly to the preparation of the halftone plate from which the printing plate is formed.

One of the principal objects of the invention is to provide an improved process whereby negatives may be photo-automatically produced in which the high-lights are devoid of screen pattern.

The subject to be reproduced by photoengraving process comprises solid matter, shaded matter and high lights. The usual photoengraving process resolves the shaded portions into dots of size depending upon the darkness of the shading. But it also gives screen pattern in the high or brightest lights, which is objectionable for many purposes.

In accordance with the present invention, I take the subject of the invention, usually a drawing or photograph (although it may be a three-dimensional subject), and cover the shaded portions with a transparent color, that is, a color which does not obscure the shading of the subject.

I employ a plate or film which is sensitive to the color employed and also to the color complementary thereto. Thus, any plate or film sensitive in the red and green is suitable for this process when using a red color for tinting up the subject, and any plate sensitive in the blue and yellow-orange is suitable when using a blue color for tinting up the subject.

Then I expose the plate to the image of the subject through a screen in the usual manner but with light of the color used for tinting up the subject, or what amounts to the same thing, with a filter of that color in the camera.

Then I remove the screen, either by elevating it out of the path of the light or by moving it forward sufficiently to render it ineffective with respect to screen action. The plate is again exposed to the subject with the use of light complementary to the tinting color. Or, a filter of such complementary color may be used on the camera.

The order of the exposures may be reversed.

To provide a slight amount of screen pattern in the black portions of the subject, the plate may be "flashed" in the usual manner. That is, the plate may be subjected to a small exposure with a sheet of paper in front of the subject.

It will of course be understood that I may use any color on the subject provided that I use the same color and a complementary color for the light of the exposures with and without a screen respectively. The operation is as follows:

The solid or black portions have no effect upon the corresponding portions of the plate or film. These portions, consequently, have only the slight degree of screen pattern resulting from "flashing." The shaded portions of the subject are reproduced on corresponding portions of the plate or film as dots during the exposure with the screen. The size of the dots corresponds to the degree of shading on the subject. Since the light reaching the plate or film during this exposure is the same as the color applied to the subject, that color has no effect, and this exposure functions like a usual photoengraving exposure. During the other exposure the color on the subject absorbs complementary color and consequently no light reaches the plate or film from the shaded portions of the subject during this exposure. Consequently, these portions of the plate or film are unaffected and their dot structure is unimpaired. The portions of the plate or film corresponding to the highlights tend to receive screen pattern as the result of the "flashing" and the exposure with the screen. However, during the exposure without the screen with light of color complementary to the tinting color on shaded portions of the subject, the highlights of the subject transmit strong unscreened light over the corresponding portions of the plate or film.

Consequently, when the plate or film is developed and intensified in the usual manner, the solid portions of the subject reproduce as transparent with slight screen pattern, the shaded portions reproduce as dotted portions, and the highlights are reproduced as dead black upon the negative.

It is to be understood that I may employ any desired color for tinting up the highlights of the subject or drawing. Thus, I may employ any red dye such as eosin in which case the screened exposure may be made with the aid of red light or a red filter and the unscreened exposure may be made with green light or a green filter.

I find, however, that it is highly advantageous to use blue dyes for tinting up the subject since in that case I may make the screened exposure with ordinary light and without any filter and the unscreened exposure with yellow-orange light or with a yellow-orange filter. Indeed, this last-named procedure may be followed with any color in the blue end of the spectrum, using the proper light or filter of complementary color for the unscreened exposure. I may operate in this way because of the high actinic value of the light in the blue end of the spectrum.

Among the blue dyes which are particularly suitable for this purpose are Ultramarine Blue H. M., Soluble American Blue, both manufactured by Calco Chemical division of American Cyanamic Co., and a mixture of Indigotine, Conc. and Victoria Blue (Pure) B. O. (Du Pont). All of these dyes may be used with common types of sensitive emulsions in the negative element using ordinary light for the screened exposure. When these three dyes are used, a satisfactory yellow-orange filter is Wratten filter No. 21.

It will of course be understood that the color thus applied to the subject may be bleached or removed in any suitable manner. Thus, ultramarine blue may be discharged by a spray of hydrochloric acid or any other strong acid. Soluble American blue may be discharged by sodium hydroxide spray. The mixture of Indigotine, Conc. and Victoria Blue may be discharged with a hypochlorite spray containing one per cent available chlorine.

While I prefer to employ colors which are exactly complementary, it must be understood that I employ the term "complementary" in a broad sense to indicate two colors which are substantially separated in the spectrum, since any two such colors will give excellent results in reproducing shaded portions with high accuracy while suppressing screen pattern in the highlights.

Having thus described my invention, I declare that what I claim is:

1. The method of preparing half-tone negatives which comprises the steps of manually applying transparent color over the half-tone areas of the subject to be reproduced, subjecting a negative element in two registering exposures to light from said subject, one of said exposures being made through a screen to register gradations of the half-tone areas, the other of said exposures being made with the screen effectually removed and with light which is absorbed by said transparent color, said negative element being sensitive to both lights.

2. The method of making half-tone negatives without screen pattern in the highlights which consists in manually applying on the shaded portions of a pictorial representation a transparent color, photographing said representation upon a light-sensitive element in two exposures, one of said exposures being made through a screen to register gradations of the half-tone areas, the other of said exposures being made with the screen effectually removed and with light of a color complementary to said transparent color, said exposures being in register upon the light-sensitive element, which light-sensitive element is sensitive to both lights.

3. The method of preparing half-tone negatives which comprises the steps of manually applying transparent color over the half-tone areas of the subject to be reproduced, exposing a negative element in two registering exposures to light from said subject, one of said exposures being made through a screen and with light including light of said transparent color to register upon the negative element light gradations of the half-tone areas, the other of said exposures being made with the screen effectually removed and with light which is absorbed by said transparent color, said negative element being sensitive to both said lights.

4. The method of making half-tone negatives without screen pattern in the highlights, which consists in manually applying on the shaded portions of a pictorial representation a transparent element, photographing said representation upon a light-sensitive element in two exposures, one of said exposures being made with the aid of a screen and with light containing light of the same color of said transparent color to register the shaded portion on the element effectually removed, and with light of color complementary to said transparent color, said exposures being in register upon the light-sensitive element, which light-sensitive element is sensitive to light of both said colors.

5. The method of preparing half-tone negatives which comprises the steps of manually applying a transparent color of the blue end of the spectrum over the half-tone areas of the subject to be reproduced, exposing the negative element in two registering exposures to light from said subject, one of said exposures being made through a screen, the other exposure being made with the screen effectually removed, and with light which is absorbed by said transparent color, said negative element being sensitive to both lights.

6. The method of making half-tone negatives without screen pattern in the highlights which consists in manually applying on the shaded portions of a pictorial representation a transparent blue color, photographing said representation upon a light-sensitive element in two exposures, one of said exposures being made through a screen, the other exposure being made with the screen effectually removed and with light of a color complementary to said blue color, said exposures being in register upon the light-sensitive element, which light-sensitive element is sensitive to both lights.

WALTER S. MARX, Jr.